United States Patent  
Amram et al.

(10) Patent No.: US 6,930,601 B2
(45) Date of Patent: Aug. 16, 2005

(54) DIGITAL DATA EXCHANGE SYSTEM

(75) Inventors: Eric Amram, Neuilly-sur-Seine (FR); Avner Cohen Solal, Paris (FR)

(73) Assignee: Evenium, Paris (FR)

( * ) Notice: Subject to any disclaimer, the term of this patent is extended or adjusted under 35 U.S.C. 154(b) by 130 days.

(21) Appl. No.: 10/474,266

(22) PCT Filed: Apr. 9, 2002

(86) PCT No.: PCT/FR02/01245

§ 371 (c)(1), (2), (4) Date: Oct. 6, 2003

(87) PCT Pub. No.: WO02/084978

PCT Pub. Date: Oct. 24, 2002

(65) Prior Publication Data

US 2004/0113807 A1 Jun. 17, 2004

(30) Foreign Application Priority Data

Apr. 10, 2001 (FR) .................................... 01 04849

(51) Int. Cl.⁷ ............................................. H04Q 7/00
(52) U.S. Cl. ............................ 340/539.11; 340/5.61; 235/383; 705/21
(58) Field of Search ........................ 340/539.11, 10.33, 340/5.61, 10.42, 825.72; 235/380, 383; 705/21, 27

(56) References Cited

U.S. PATENT DOCUMENTS

| 5,796,351 | A |   | 8/1998 | Yabuki ................. 340/625.69 |
| 5,936,542 | A | * | 8/1999 | Kleinrock et al. ......... 340/5.61 |
| 6,130,892 | A | * | 10/2000 | Short et al. ................. 370/401 |
| 6,774,787 | B1 | * | 8/2004 | Melbourne ............... 340/539.1 |
| 6,823,084 | B2 | * | 11/2004 | Myers et al. ............... 382/187 |

FOREIGN PATENT DOCUMENTS

EP  0841828 A2  10/1997

* cited by examiner

Primary Examiner—John Tweel, Jr.
(74) Attorney, Agent, or Firm—Sutherland Asbill & Brennan LLP

(57) ABSTRACT

A system for exchanging digital data between a plurality of users comprises a first computer installation (12) in which said digital data is stored together with at least one determined identity code allocated to each of said items of digital data, and a portable device for sending and receiving digital data (10) for each user for the purpose of receiving the identity codes, each of the portable devices including communications means so as to enable portable devices to exchange the identity codes between each other and transfer them to the first computer installation, said first computer installation then making available to each user of the portable devices the digital data associated with the identity codes as transferred in this way.

24 Claims, 5 Drawing Sheets

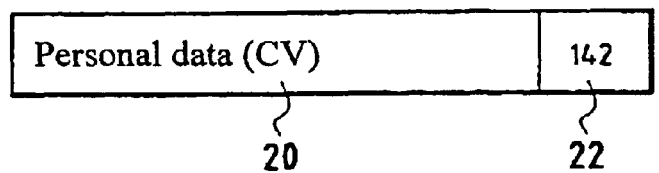
FIG.2A
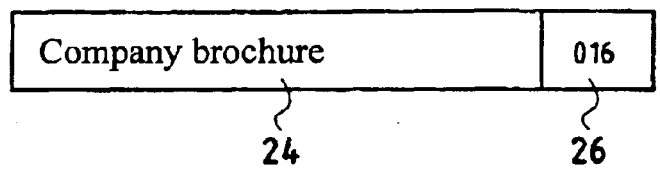
FIG.2B
| Mr. Durant's personal data | 120a |
| Ms. Duclos' personal data | 120b |
| Mr. Remi's personal data | 120c |
| Company brochure | 1201 |
| Product A brochure | 1202 |
| Product B brochure | 1203 |
| Product C brochure | 1204 |
| Satisfied client audio | 1205 |
28  30
FIG.2C

DIGITAL DATA EXCHANGE SYSTEM

FIELD OF THE INVENTION

The present invention relates to a device for exchanging digital data between two parties meeting each other during a special event such as a trade show.

BACKGROUND OF THE INVENTION

At present, e.g. in trade shows, when two people meet and one of them desires to receive additional information from the other, and vice versa, such as a CV, a business brochure, product documentation, audio or video demonstration files, or any other information that is not immediately available, they exchange respective business cards that give their contact details, in particular e-mail addresses, and they specify orally or in writing, the additional data that they desire to receive from each other. On getting back to their desks or homes, after the show is over, these people can then send the requested items to the other parties by mail, fax, or e-mail providing the items in question are available in the form of digital data. In a variant, each person may go and retrieve the data from an Internet site whose URL address has been provided by the other party, possibly together with a confidential access code.

That process of supplying information, which operates essentially in deferred time, is restrictive and ill-suited to making multiple contacts where a very large amount of data needs to be exchanged between a large number of parties.

Thus, a few years ago, there appeared what can be referred to as a "CD-ROM business card" which is in the form of a computer-readable digital compact disk with the dimensions of a credit card. Thus, on meeting another party, digital data of one or more of the kinds defined above can be transferred immediately. Nevertheless, the storage capacity of such cards is restricted, and once the CD has been written, it can no longer be changed. The information provided is thus frozen at its date of manufacture and cannot be updated subsequently. In addition, the cost of producing such CD-ROM cards is still relatively high.

More recently, portable computer devices known as personal digital assistants (PDAs) have appeared on the market that enable digital data to be exchanged with an external computer or another PDA over an infrared link or a radio link. Nevertheless, in this case also, the volume of information that can be transmitted is limited by the memory capacity of such devices (it is difficult to exchange video files, for example), and in addition transmission between two such devices requires them to be fully compatible and requires a specific data exchange protocol to be complied with (and if the link is an infrared link, the two devices need to be carefully positioned relative to each other).

SUMMARY OF THE INVENTION

The present invention seeks to mitigate those drawbacks by a method and a system for exchanging digital data between two parties, making it simple to communicate a large quantity of data with multiple parties and also enabling the data to be updated automatically.

These objects are achieved by a method of exchanging digital data between a plurality of users, each of the users being provided with a portable device for sending and receiving digital data, the method being characterized in that it comprises the following steps: inputting said digital data for exchanging between users into a first computer installation; allocating at least one determined identity code to each input item of digital data; transferring each of the determined identity codes as allocated in this way to the portable device of the user whose digital data associated with said determined identity codes has previously been input into said first computer installation; establishing connections between the portable devices of different users, over which the devices transmit between each other their at least one determined identity codes; transferring the determined identity codes received in this way from each of the portable devices to said first computer installation; and making available to each user of said portable devices the digital data associated with said determined identity codes as transferred in this way.

The first step of inputting digital data into said first computer installation is performed via a user interface of said computer installation. Preferably, said user interface is selected from one of the following interfaces: Web; e-mail; terminal.

The second step in which said first computer installation allocates said identity code to said digital data may be performed by a random creation process, or else from a unique card number entered by the user to said first computer installation.

The third step of transferring said determined identity code to said portable device may be performed via a second computer installation that is local and optionally connected to said first computer installation via a communications network.

The fourth step of putting two portable devices into communication with each other is performed over a connection of the electrical, magnetic, acoustic, optical, or radio frequency type.

The fifth step of transferring said determined identity code to said first computer installation is performed via a second computer installation that is local and optionally connected to said first computer installation via a communications network.

In the intended implementation, the sixth step of making said digital data available to users may be performed by sending said digital data to an e-mail address of the user, or else by consulting said digital data directly at said first computer installation via a communications network.

The present invention also provides a system for exchanging digital data by implementing the above-specified method.

These and other features of the present invention will become apparent upon review of the following detailed description of the preferred embodiments when taken in conjunction with the drawings and the appended claims.

BRIEF DESCRIPTION OF THE DRAWINGS

The characteristics and advantages of the present invention appear better from the following description given by way of non-limiting indication and with reference to the accompanying drawings, in which:

FIGS. 2A, 2B, and 2C show three examples of structure for data exchange in the FIG. 1 system;

DETAILED DESCRIPTION OF A PREFERRED EMBODIMENT

Figure 1:
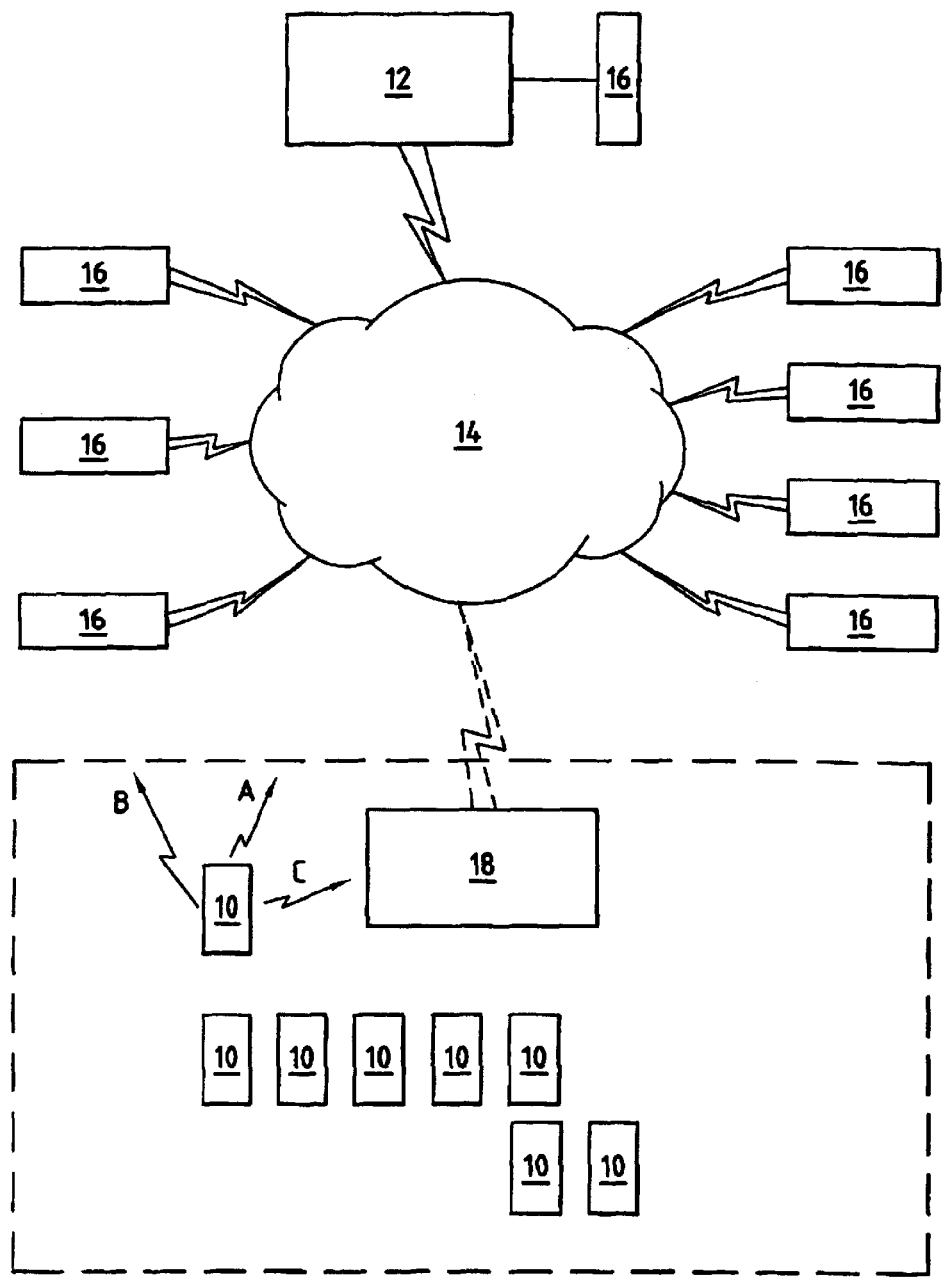
FIG. 1 is a diagrammatic view of a digital data exchange system of the invention.

FIG. 1 shows a digital data exchange system in accordance with the present invention.

The term "digital data" is used to mean any type of information that can be represented in digital form. Specifically, it comprises information that might be held by an individual, a group of people, a business, or indeed an official body, for example. As examples amongst others, mention can be made of personal data (civil status, postal address, etc.) or professional data (CV) relating to an individual, commercial data relating to a company (product or business brochures), or indeed financial data (company accounts). These various kinds of information can be present individually on a variety of media (audio, video, text, graphics) in various formats (Word, Excel, PDF, etc.) and accessible through a variety of consultation means.

When two people meet physically, they are not always in a position to be able to exchange the information they would like to, either because one of them does not have means for receiving the information on offer (for example one of the people may have a PDA but not the other), or else because the information in question is not immediately available (for example there are no more brochures for a particular product left on a stand), or else because the data is too voluminous (consolidated accounts of a group of companies, for example).

Thus, in the invention, a digital data exchange system is set up in which each person called on to send information (that is available in digital form) to another person on the premises of a given event or occasion (show, fair, conference, forum, festival, workshop, etc.) is provided with an independently powered portable device 10 (e.g. powered by optionally rechargeable batteries) having the dimensions of a business card or a credit card and including at least memory means suitable for storing a plurality of exchangeable identity codes and communication means of some kind enabling one or more of the identity codes to be transferred to a portable device of another person when these two people are in each other's presence. It should be observed that it is also possible to envisage transfers amongst a plurality of people, each having their own portable device.

The above-mentioned communications means are advantageously magnetic loop coupling means (in particular for one-on-one exchanges), however it is also possible to envisage using a link based on infrared beams, sound waves (acoustic link), or radio waves. The identity codes present in each portable device for exchanging when people meet correspond to respective clearly-identified digital data items belonging to the bearer of the portable device and intended for communication to third parties.

In the invention, all of the digital data and the associated identity codes are stored in a computer server or installation 12, which is generally remote from the site of the event, and which is accessible to all of the people who might meet during the event in question, either directly (via a user terminal 16) or else via a communications network 14, e.g. the public switched telephone network (PSTN) or any other analogous communications network (GSM, LAN, telephone, Internet, etc.). Similarly, identity codes (referenced by letters A, B, C) are communicated between said remote computer installation 12 in which they are stored and the portable devices 10 of each attendee at the event via said communications network 14, either (A) directly (in which case the portable devices have additional means giving them access to the network), or else (B) via user terminals 16 (in which case the portable devices have additional interface means for interfacing said terminals), or indeed (C) and in preferred manner, via a local computer installation 18 present at the site of the event (in which case the communications means of the portable devices advantageously also act as interface means with said local computer installations). In a particular embodiment, the local computer installation may be separate from the communications network 14, with the identity codes that are supplied to the user by the remote computer installation 12 being transferred by means of a keyboard or a bar code reader associated with the local computer installation. At the end of the process of exchanging data between the various attendees at the event, the portable devices will have stored sets of identity codes which they then return to the remote computer installation, possibly via the local computer installation that is optionally connected to the communications network. If it is not so connected, then the codes are then transferred asynchronously by physically transferring the codes received, e.g. by means of a floppy disk or a CD-ROM.

FIGS. 2A, 2B, and 2C show examples of data and associated codes stored in the remote computer installation 12.

FIGS. 2A and 2B show the types of information that might be exchanged between the various attendees at a recruitment show. FIG. 2A shows the information made available by a person looking for employment, specifically a CV. This data 20 (generally in the form of text and graphics) carries an identity code 22 (e.g. 142) which thus constitutes a unique identifier for this particular person and is all that needs be stored in the memory means of that person's portable device. The information available from the company offering service is shown in FIG. 2B. In general, it comprises data 24 in the form of a company brochure describing the company and the various positions available and the people to be contacted. It also has a unique identity code 26 (e.g. 016) which is 'stored in each of the portable devices of the people representing the company on a stand or any other defined site at the show. Each company present at the show thus possesses a different identity code which is allocated to that company specifically for the duration of the show, and the same applies to each visitor looking for employment.

FIG. 2C shows another example of digital data of the kind that can be exchanged during a trade show. The data 28 relates to a company having three employees present at the show. The company may seek to make available to visitors a brochure concerning the company, brochures concerning two of its products, a video concerning a third product, and an audio recording of an inquiry into client satisfaction. Each of these data items is given a specific digital code (with the same applying to the business card containing certain items of personal data relating to each of the employees present at the show). As in the preceding example, all of the identity codes 30 and the data 28 associated with each of the codes are stored in the computer installation 12, and each attendee at the show, whether visitor or exhibitor, has a portable device that initially contains in its memory the identity codes that correspond to the data that person seeks to communicate to third parties. Thus, for example, Mr. Remi will have codes 120c (corresponding to his own personal data) and 1201 to 1205 (corresponding to available company data) stored in the memory of his portable device. It should be observed that the identity codes relating to a given company can all be derived from a unique user code (in this case 120).

Figure 3:
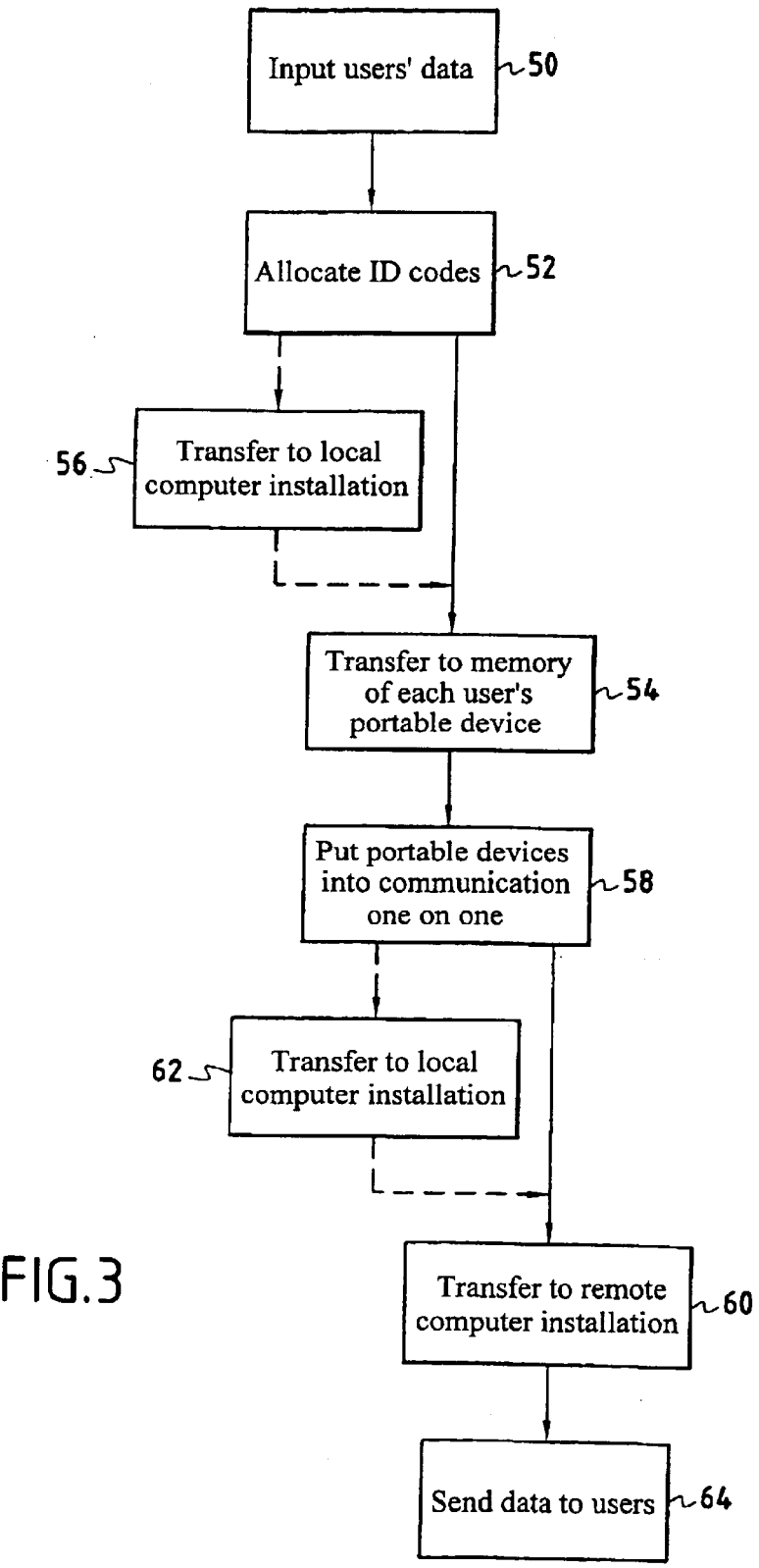
FIG. 3 is a flow chart showing the exchange method implemented in the FIG. 1 system.

There follows a description with reference to FIG. 3 of the method implemented for exchanging digital data between the various people present at a trade show, for example.

The method firstly requires a first step 50 of inputting and storing these various data items in the computer installation 12. Data is input by each of the users of the system who thus transfer to said computer installation information of the various types mentioned above (personal data; Word, Excel, PDF, etc. files; audio or video files; URL addresses; etc.) which they seek to communicate to interested third parties. Once the information has been stored in the computer installation 12, it performs a second step 52 of allocating a determined unique identity code to each data item that has been input, which code serves subsequently to find the data. Codes are preferably allocated in a very simple manner using a random creation process.

Nevertheless, it should be observed that in one possible alternative, the identity codes may also be derived from a unique number that the user also gives to the computer installation and that uniquely identifies that user's portable device. For example, the user might buy a portable device from some outlet (tobacconist, post office, etc.), with the device having such a card number and also a personal access code of the "scratch card" type giving the bearer access to the computer installation, and in particular to its user interface, from which that user's exchangeable digital data can be entered.

In a third step 54 the memory means of the portable devices 10 receive the identity codes stored by the users in the computer installation, and they receive only those identity codes (e.g. 22, 26, 30), while the associated digital data (e.g. 20, 24, 28) remains stored in the computer installation 12. In this way, each portable device 10 is loaded with the identity code(s) that have previously been input by the user of that device. In an advantageous variant of the method, the identity codes can be transferred not directly to each portable device, but to the local computer installation 18 (step 56), which in turn provides the interface with said devices. This local computer installation may optionally be connected to the communications network 14. If it is so connected, then the codes supplied to the user by the remote computer installation 12 can be transferred by means of a keyboard or a bar code reader associated with the local computer installation. Before any exchange of information, the only identity codes recorded in the memory means are therefore the codes that belong to the holder of the portable device. When two attendees meet, and seek to exchange information, this is done in a subsequent step 58 by putting their two portable devices in communication with each other, their respective communications means then exchanging their identity codes which are stored in their memory means. This step is repeated for following exchanges with other attendees and remains possible so long as the memory means of the portable device are not saturated (memory full).

When the memory is full, or more generally at the end of the show, a step 60 is performed in which the collected identity codes are transferred to the computer installation 12 which stores them. In an advantageous variant of the method, these identity codes may be transferred not directly from each portable device, but instead from the local computer installation 18 (step 62) which then acts as an interface with the remote computer installation 12 over the computer network 14. In another variant, the local computer installation can be separate from the communications network and the codes can be transferred to the remote computer installation in asynchronous manner, e.g. on a floppy disk or a CD-ROM. Once these codes have been stored, the digital data associated with the codes becomes accessible for the users who can access it directly from the remote computer installation 12 (via its user interface and giving their own identity codes), or preferably in a final step 64 the data can be sent automatically to each user's e-mail address or by any other means, e.g. by mail or fax for people not having an e-mail address (with the contact details naturally being previously communicated during the initial data inputting step 50).

It may be observed that by using a computer installation to centralize identity codes that are exchanged between all of the attendees at a given event or a particular occasion (show, fair, conference, forum, festival, workshop, etc.), it is possible for the digital data that is sent to the participants to be updated automatically and very simply. The computer installation knows exactly which users have received such and such a data item, so it is possible for the installation to respond to an item being updated via its user interface to communicate the new version of the corresponding document automatically to all of the users who received the preceding version, with this communication being performed in the same manner as before (unless a user has requested a change in the way information is communicated).

Figure 4:
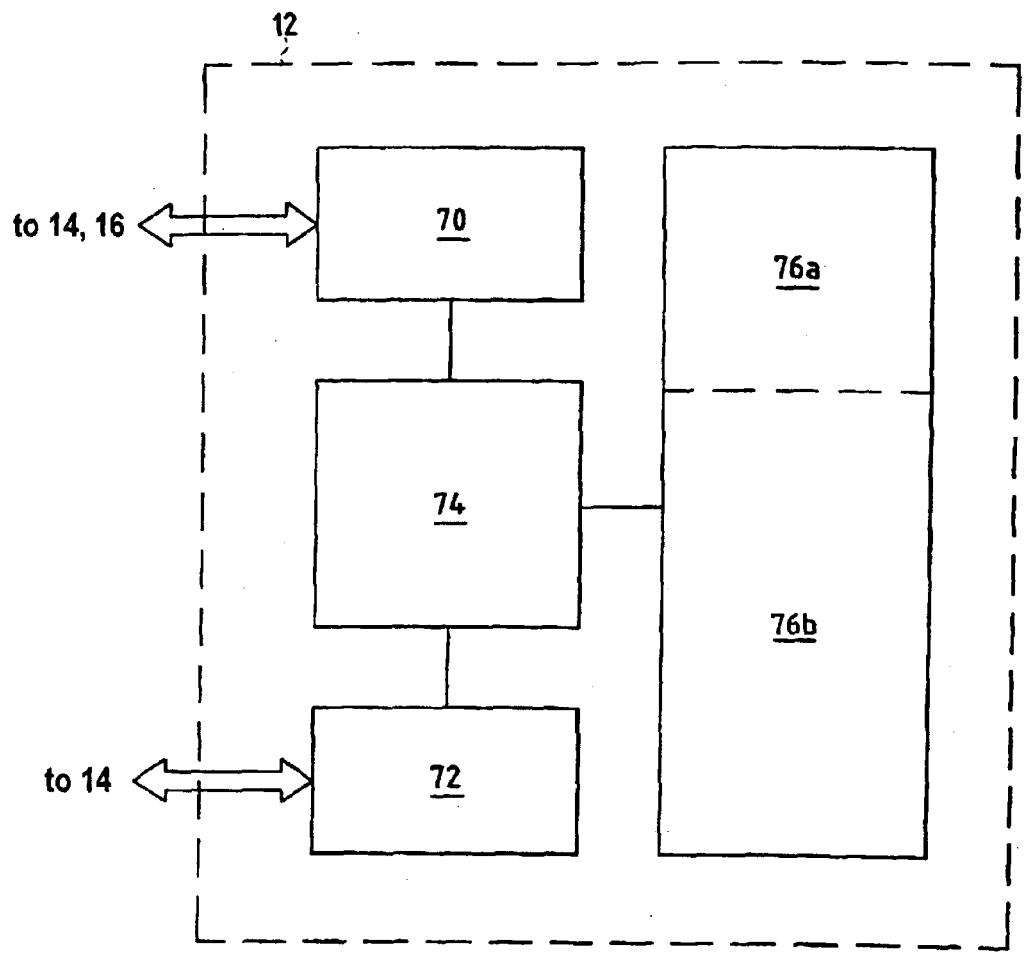
FIG. 4 shows a first embodiment of a computer system implemented in the FIG. 1 system.

The structure of the remote computer installation 12 is described in greater detail with reference to FIG. 4 which shows the main interfaces and functions of this installation (with the exception of commonplace functions of administering and deriving statistics from the collected data).

This computer installation firstly comprises a user interface 70 for managing digital data (and possibly card numbers) input by users, for displaying the data and for updating it (adding to it, modifying it, deleting it). This input interface may be of any known type: a simple computer terminal, a mobile telephone terminal, an e-mail terminal, a Web page, etc. The installation also has a communications interface 72 for controlling data exchanges directly with portable devices or preferably with the local computer installation. This information is a conventional type of network interface, e.g. a PSTN interface, an ISDN interface, etc. These two interfaces 70 and 72 are connected to a processor module 74 which is associated with a RAM type storage memory 76 or the like (an additional mass memory (not shown) is also provided in order to provide long-term backup for the various data items).

The processor module manages the memory as a function of information and orders received via the interfaces and also handles dynamic updating of the digital data stored by users. For this purpose, the processor module begins by detecting whether a user is modifying digital data via the user interface and then it looks for other users who have received the previous version of the data, and if it finds any, it transmits the updated data to those users (unless, for example, those users have already stated beforehand they do not wish to receive updates).

The memory of the remote computer installation is preferably organized as two zones: a first zone 76a for storing digital data input by users (sender data), and a second zone 76b for storing the digital data corresponding to the identity codes received from other attendees (receiver data). The sender or receiver data is naturally accessible via the user interface 70.

Figure 5A:
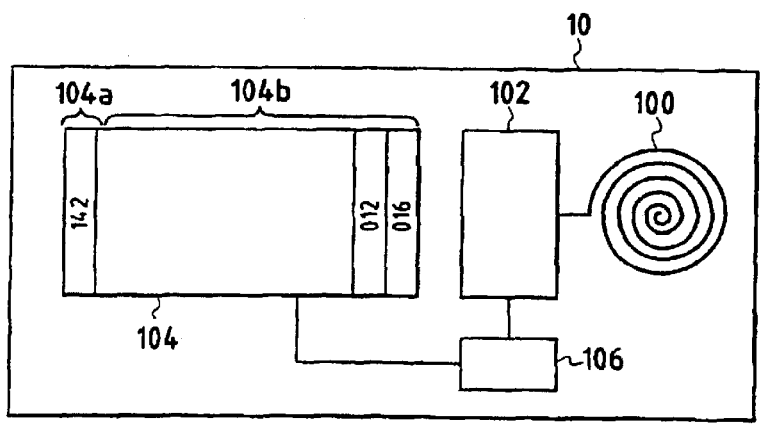
FIGS. 5A to 5C show three embodiments of a portable device implemented in the FIG. 1 system.
Figure 5B:
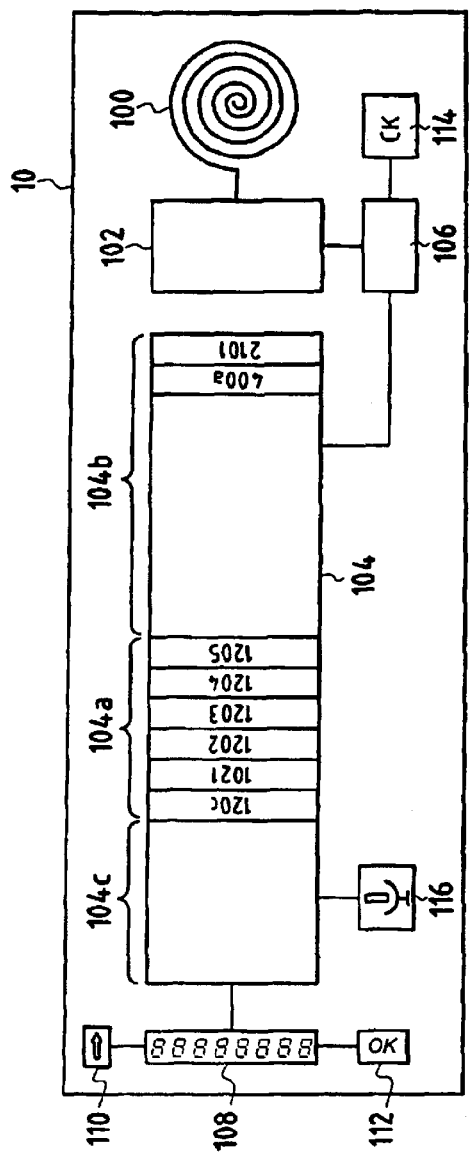
Figure 5C:
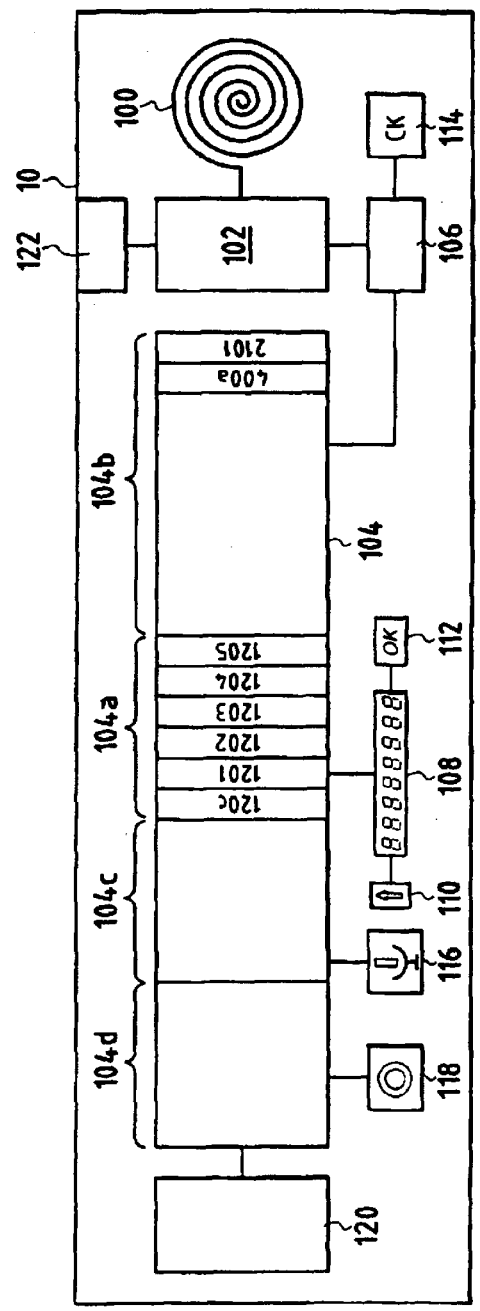

Three non-limiting embodiments of portable devices are shown in FIGS. 5A, 5B, and 5C.

FIG. 5A shows a portable device of basic structure in the form of a small electronic object having a business card or credit card format and including a data transceiver portion (communications means) constituted by a magnetic loop 100, a processor portion connected to an outlet of the magnetic loop and constituted by an encoding/decoding circuit 102, a memory 104 for storing identity codes connected to said circuit, and a power supply circuit (e.g. a battery 106) connected simultaneously to the processor portion and to the memory. In this configuration, the data transceiver portion enables communication to be provided in both directions without electrical contact with another portable device 10 or with the local computer installation 18. As in the remote computer installation 12, the memory of the portable device is preferably organized into two zones comprising a first zone 104a (sender zone) for receiving the identity codes that are for communication to the portable device of another user, and a zone 104b (receiver zone) for storing the identity codes received when exchanging codes with other users. This communication process between two portable devices is naturally reciprocal, so the identity codes in the sender zone of the first device are copied into the receiver zone of the second device, and vice versa.

A second embodiment of a portable device in accordance with the invention is shown in FIG. 5B. This embodiment is of a structure that is more elaborate than the preceding device, while nevertheless retaining a similar small format.

In addition to the elements mentioned above and given the same references, this device also includes a very simple display screen 108, preferably for displaying one or two lines of characters, thus enabling the various sender identity codes to be viewed so as to enable them to be selected individually by means of a scroll button 110 and an enter button 112 (the user can thus decide which codes to transfer and thus which data to communicate to the other party), and also to display certain prerecorded messages such as "memory empty" (blank card) or "memory full" or indeed "battery low" (change battery). If the device is advantageously provided with a clock circuit 114, the screen can also display a time and a date that can be optionally stored together with the identity codes that are exchanged. This feature is advantageous when the portable device also has a microphone 116 enabling a commentary by the user and the other party to be recorded digitally (with such recording being started and stopped using the screen and the control buttons). In this particular case, the memory is advantageously provided with a third memory zone 104c (annotation zone) for storing commentaries. At the end of the day, when the event is over (or when the corresponding memory zone is full), these comments are transmitted like identity codes (together with the dates and times of the exchanges) to the remote computer installation 12 where the user can subsequently consult them or from which they can be sent.

FIG. 5C shows another version that is even more elaborate with the addition of visual recording means such as a miniature camera 118 (together with its associated processing circuit) in association with a fourth memory zone 104d. This portable device may also have a second data transceiver portion 120 connected to the memory 104 for transferring identity codes to the remote computer installation 12 via the network 14 and without passing through the local computer installation 18. This interface may be constituted by a single chip suitable for being read by a conventional smart card reader present in or connected to the user terminal 16, or else in a wireless connection module for making a connection with the communications network 14. In addition, an interface 122 with an external device (keyboard, graphics tablets, etc.) connected to the processor portion 102 is preferably provided to further increase the facilities of the portable device, particularly in terms of inputting annotations.

It should be apparent that the foregoing relates only to the preferred embodiments of the present invention and that numerous changes and modifications may be made herein without departing from the spirit and scope of the invention as defined by the following claims and the equivalents thereof.

What is claimed is:

1. A method of exchanging digital data between a plurality of users, each of the users being provided with a portable device for sending and receiving digital data, the method being characterized in that it comprises the following steps: inputting said digital data for exchanging between users into a first computer installation; allocating at least one determined identity code to each input item of digital data; transferring each of the determined identity codes as allocated in this way to the portable device of the user whose digital data associated with said determined identity codes has previously been input into said first computer installation; establishing connections between the portable devices of different users, over which the devices transmit between each other their at least one determined identity codes; transferring the determined identity codes received in this way from each of the portable devices to said first computer installation; and making available to each user of said portable devices the digital data associated with said determined identity codes as transferred in this way.

2. A method according to claim 1, characterized in that said first step of inputting digital data into said first computer installation is performed via a user interface of said computer installation.

3. A method according to claim 2, characterized in that said user interface is selected from one of the following interfaces: Web; e-mail; terminal.

4. A method according to claim 1, characterized in that said second step in which said first computer installation allocates said identity code to said digital data is performed by a random creation process.

5. A method according to claim 1, characterized in that said second step in which said first computer installation allocates said identity code to said digital data is performed from a unique card number entered by the user to said first computer installation.

6. A method according to claim 1, characterized in that said third step of transferring said determined identity code to said portable device is performed via a second computer installation that is local.

7. A method according to claim 1, characterized in that said fourth step of putting two portable devices into communication with each other is performed over a connection of the electrical, magnetic, acoustic, optical, or radio frequency type.

8. A method according to claim 1, characterized in that said fifth step of transferring said determined identity code to said first computer installation is performed via a second computer installation that is local.

9. A method according to claim 6, characterized in that said local second computer installation is connected to said first computer installation via a communications network.

10. A method according to claim 1, characterized in that said sixth step of making said digital data available to users is performed by sending said digital data to an e-mail address of the user.

11. A method according to claim 1, characterized in that said sixth step of making said digital data available to users is performed by consulting said digital data directly at said first computer installation via a communications network.

12. A method of exchanging digital data between a plurality of users, each of the users being provided with a portable device for sending and receiving digital data, said device having a unique identity number, the method being characterized in that it comprises the following steps: inputting said digital data that is to be exchanged between users into a first computer installation; allocating said unique identity numbers to said input items of digital data; establishing connections between the portable devices of different users whereby the devices transmit to each other their unique identity numbers; transferring from each of said portable devices to said first computer installation the determined identity numbers that been received in this way; and making available to each user of said portable devices the digital data associated with the unique identity numbers as transferred in this way.

13. A system for exchanging digital data between a plurality of users, the system being characterized in that it comprises:
- a first computer installation in which said digital data for exchanging between said users is stored together with at least one determined identity code allocated to each of said items of digital data;
- a portable device for transmitting and receiving digital data carried by each of said plurality of users and having stored therein said determined identity codes;
- each of said portable devices having communications means enabling them to exchange between one another said determined identity codes and to transfer to said first computer installation said determined identity codes as received in this way; and
- said first computer installation then making available to each user of said portable devices said digital data associated with said determined identity codes as transferred in this way.

14. A system according to claim 13, characterized in that it further comprises a second computer installation that is local for receiving from said portable devices said determined identity codes that are to be transferred to said first computer installation.

15. A system according to claim 14, characterized in that said second computer installation is connected to said first computer installation via a communications network.

16. A system according to claim 13, characterized in that each of said portable devices comprises a first portion for sending and receiving data for transferring said identity codes, a processor portion connected to said first portion for sending and receiving data, a memory connected to said processor portion for storing received identity codes, and a power supply portion connected both to said processor portion and to said memory enabling said portable device to operate without an external power supply.

17. A system according to claim 16, characterized in that each of said portable devices further comprises display means for displaying at least said determined identity codes.

18. A system according to claim 17, characterized in that each of said portable devices further comprises at least one scroll button and an enter button for using said display means to enable said identity codes for transmission to be selected.

19. A system according to claim 16, characterized in that each of said portable devices further comprises a clock circuit enabling determined dates and times to be stored.

20. A system according to claim 16, characterized in that each of said portable devices further comprises sound recording means for recording a commentary and for storing it in said memory in a third storage zone.

21. A system according to claim 16, characterized in that each of said portable devices further comprises visual recording means for recording images storing them in said memory in a fourth storage zone.

22. A system according to claim 16, characterized in that each of said portable devices further comprises a second portion for sending and receiving data in order to transfer said identity codes to said first computer installation via said communications network without passing via said computer installation.

23. A system according to claim 16, characterized in that each of said portable devices further comprises an interface with an external device, in particular to enable annotations to be input.

24. A method according to claim 8, characterized in that said local second computer installation is connected to said first computer installation via a communications network.

* * * * *